United States Patent [19]

Brownlow et al.

[11] Patent Number: 4,629,662
[45] Date of Patent: Dec. 16, 1986

[54] BONDING METAL TO CERAMIC LIKE MATERIALS

[75] Inventors: James M. Brownlow, Crompond; Thomas S. Plaskett, Katonah, both of N.Y.

[73] Assignee: International Business Machines Corporation, Armonk, N.Y.

[21] Appl. No.: 673,076

[22] Filed: Nov. 19, 1984

[51] Int. Cl.$^4$ .............................................. B32B 9/00
[52] U.S. Cl. ................................... 428/432; 428/446; 428/469; 428/701
[58] Field of Search ............... 428/432, 446, 469, 701

[56] References Cited

U.S. PATENT DOCUMENTS

| 4,153,518 | 5/1979 | Holmes et al. | 204/38 B |
| 4,366,042 | 12/1982 | Caldwell et al. | 204/290 F |
| 4,525,425 | 6/1985 | Church | 428/428 |

FOREIGN PATENT DOCUMENTS

| 466321 | 7/1950 | Canada | 427/126.2 |
| 841655 | 5/1970 | Canada | 428/469 |
| 0067252 | 12/1982 | European Pat. Off. | 428/469 |
| 2149902 | 3/1973 | France | 428/469 |

OTHER PUBLICATIONS

IBM Technical Disclosure Bulletin, vol. 12, No. 8, Jan. 1970, Microrough Surface Bases for Electroless Platins, Spannhake.
Thin Solid Films, 33 (1976) 99–105, "Adhesion of Copper Films to Aluminum Oxide Using a Spinel Structure Interface" by Gerald Katz.
Glasses, Borax Consolidated Limited, pp. 60–65.
Ceramic Glazes by Felix Singer, pp. 17, 18 and 93.

Primary Examiner—John E. Kittle
Assistant Examiner—Patrick J. Ryan
Attorney, Agent, or Firm—Alvin J. Riddles

[57] ABSTRACT

The bonding of an external metal taken from the group of Cu, Ni, Fe, Ti, Mo and alloys thereof to an oxide ceramic substrate is accomplished through the use of an ionic diffusion accommodating metal oxide where the ionic diffusion oxide metal is taken from the group of Fe, Mn, Ti and the combination 33 Ni 67 V. The bond adhesion and processing parameters can be enhanced by addition of Li, Ni, Cu, Co and Mo and the ceramic can be at least one member of the group of glass, pyrex, $Al_2O_3$ and $SiO_2$ glass.

12 Claims, 3 Drawing Figures

BONDING METAL TO CERAMIC LIKE MATERIALS

DESCRIPTION

1. Technical Field

The technical field of the invention is in the bonding of metal to ceramic In a number of applications, particularly in the electrical, electronic and decorative arts, it is desirable to tightly fasten a metal member such as a conductor to an inert, insulating or specific conductivity ceramic like member for use under conditions where a long lifetime, wide temperature cycles, resistivity, expansion match strength and economy are considerations.

2. Background Art

In the electrical arts, external metal members are usually caused to adhere to insulating materials such as high silica content substrates by applying a first metal selected for an adherence property to the substrate and thereover applying usually by plating a second metal selected for another property such as resistivity. The technique provides well bonded films but limitations are encountered in having several materials with different properties. This technique is described in U.S. Pat. No. 4,153,518.

There is also a recognition in these arts that a copper film could be caused to adhere to an aluminum oxide substrate by forming an aluminate oxide, a spinel structure oxide of the metal of the substrate in this case which would provide a gradual change instead of a well-defined boundary. The formation of aluminate spinels under these conditions requires temperatures in excess of 1000° C. This technique provides a good bond but the spinel is limited to an ingredient of the substrate ceramic. This work was reported in Thin Solid Films 33 (1976) pages 99–105.

DISCLOSURE OF THE INVENTION

It has been found that a certain group of metals will form an oxide layer that not only will adhere with an oxide bond to ceramic-like materials but also will bond with an interstitial mixing similar to ionic diffusion to an external metal. The invention permits fastening an external metal bond to a substrate at much lower temperatures.

In the ceramics art it has been well known that since the structure of the ceramic, which includes glasses, is that of oxygen atoms linked together by metal atoms then a metal oxide which is also oxygen atoms linked together by metal atoms when placed on the surface of the ceramic will, when heated to the vicinity of fusion, bond to the ceramic by continuing the basic oxygen atom metal atom interlinkage.

In accordance with the invention an oxide of a metal that forms ionic diffusion accommodating sites in the oxide will, when placed between a ceramic-like material and an external metal, not only bond in the well known way to the ceramic material at a minimal temperature, but also will provide a bond with the external metal in which ions from the metal enter and interstitially intermingle with the oxide. The ionic diffusion type of bond is like the bond in articles formed by fusing glass to nickel-iron alloys, and that of sealed-in leads for light bulbs and electron tubes.

In accordance with the invention, it has been found that an ionic diffusion receiving layer can be formed of oxides of Fe, Mn, Ti and the combination 33 Ni 67 V. The oxides of these metals can be used singly or in combination. It has further been found that the oxides of these metals can have the properties of the bond and the processing conditions modified by additions from the group of Li, Ni, Cu, Co and Mo. The ionic diffusion receiving oxide adhesion layer will bond a metal taken from the group of Cu, Ni, Fe, Ti, Mo and alloys such as 38 Ni 62 Fe and NiFeCr, to an oxide ceramic such as glasses, $SiO_2$ and $Al_2O_3$.

Figure 1:
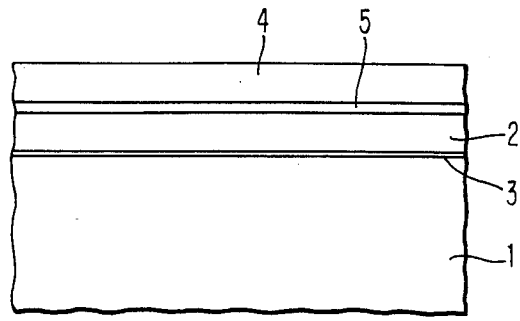
FIG. 1 is a sketch of the elements of a metal bonded to a ceramic like material of the invention.

Referring to FIG. 1, an illustration is provided of the bonding of metal to ceramic material technique of the invention wherein on an oxide ceramic member 1, such as glass, $SiO_2$ or $Al_2O_3$ or mixtures thereof, an external metal ionic diffusion receiving oxide interlayer 2 is oxygen bonded at an interface 3 where the oxygen and metal interlinkage of the ceramic 1 is continued across the interface 3 into the oxide 2 which has metal ions different from that of the metal ions in the ceramic 1. A metal conductor 4 is bonded to the oxide interlayer 2 at an ionic diffusion interface 5. The interface 5 is shown schematically wide to emphasize the ionic interstitial intermingling between the metal oxide 2 and the metal 4.

The ceramic member 1 in FIG. 1 to which the external member is to be bonded is an oxygen and metal ion interlinked material and includes glasses, $SiO_2$, sapphire or $Al_2O_3$ and various mixtures of glasses and crystalline phases.

The metal oxide 2 in FIG. 1 is defined as being capable of accommodating a bond of the ionic diffusion type from the external metal 4 of FIG. 1 and is an oxide of a metal that forms at less than 1000° C. in a structure that can accommodate both monoatomic and ionic diffusion. The 1000° C. temperature is a temperature above which many chemical and physical processes move so rapidly that damage to what is being made takes place. It is always desirable to stay as low as possible. The metal of the oxide 2 need not be the metal in the ceramic 1 since the bond at the interface 3 involves oxygen rather than the metal of the ceramic as is the case in the Thin Solid Film prior art. At this state of the art, all metal members of oxide ceramics require processing in the vicinity of 1000° C. or above.

The metal oxide structure 2 must accommodate ionic diffusion from the external metal 4. This property of having the ability to accommodate bonds of more than one valence has been attributed to molecular structures of the spinel type. The metal oxide 2 includes oxides of Fe, Mn, Ti and the combination of 33 Ni 67 V, either singly or in combination with optional additions of Li, Ni, Cu, Co, V, and solid solutions thereof, such as the product of oxidation of Ni and Fe known as Invar (38% Ni 62% Fe).

The metals in the interlayer oxide are considered to be present as ions with either or both of the following valences: Fe—++ or +++, Mn—++ or +++, Ti—+++ or Ti++++ and 33 Ni 67 V—Ni++ V+++.

The additions to the ingredients of the interlayer oxide are considered to be present as ions with either or both the following valences: Li—+, Cu—+ or ++, Ni—++, Co—++ or +++ and V—+++.

The inclusion of the additions has been found to lower the temperature for bonding and to improve the bond strength.

The external metal member 4 is a metal chosen for a performance property. It must be capable of providing at least one ionic diffusant which is an atom with a valence from 1 to 4. The external metal 4 is taken from the group of Cu having either or both a + or a ++ valence, Ni++, Fe having either or both ++ and +++, Ti having either or both +++ and ++++ and Mo++. Other ternary alloys such as Ni-Fe-Cr, stainless steels, nichromes and heat resistant alloys can be employed.

Figure 2:
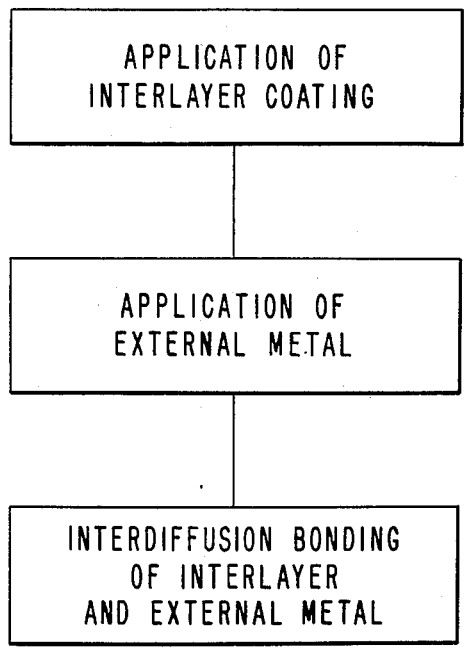
FIG. 2 is a block diagram illustrating the principal process steps involved in the structure of FIG. 1.

Referring next to FIG. 2, a schematic flow chart is provided to illustrate the principal steps involved in bonding the external metal member to the ceramic.

There are three general steps. In the first general step a coating of a metal or a compound of the metal that will form the oxide 2 of FIG. 1 is applied to the ceramic 1. The coating is oxidized at less than 1000°. Where the coating is the metal only, oxygen is environmentally supplied. Some coatings oxidize in air.

In the second general step, the external metal is applied. This can be done by machine processes such as sputtering, evaporation, spinning and vapor deposition and can even be accomplished by positioning a stamped preform on the surface of the oxide interlayer.

In the third general step, a heat treatment cycle at less than 1000° C. takes place that provides the oxide bond 3 to the ceramic 1, forms the intermediate metal oxide layer 2 in a structure capable of accommodating ionic diffusion and causes the ionic diffusion type interstitial mxing bond 5 between the external metal 4 and the metal oxide interlayer 2.

As an alternative, it is possible to combine general steps 2 and 3 by providing a high, diffusion producing temperature, of the range of 350°, while applying the external metal. This causes the interdiffusion as the metal layer is applied. As another alternative, useful with heat resistant alloys as the external metal, the interlayer oxide is applied by spinning on the heat resistant alloy and then heated to 600° C. in $N_2$, followed by a heat cycle under pressure with glass at 730° C. in $N_2$. The glass conforms to the heat resistant metal. As a further alternative, a metal such as Fe can be evaporated on the substrate, a heat treatment will oxidize to $Fe_2O_3$ and an external metal such as Cu when subjected to a heat cycle will interact with the $Fe_2O_3$ forming a bond.

Figure 3:
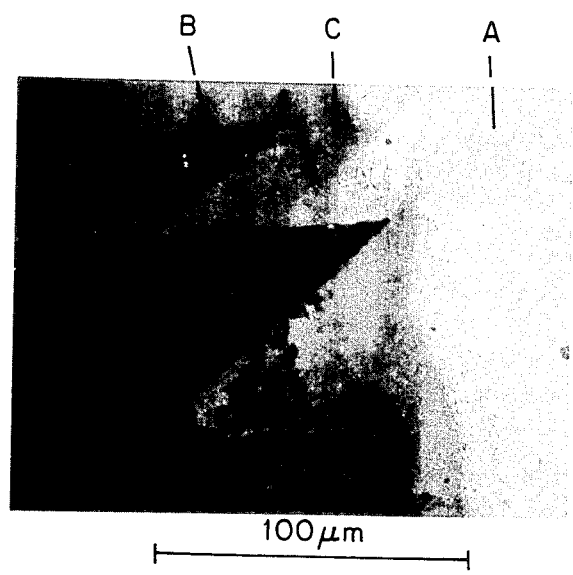
FIG. 3 is a photomicrograph illustrating the details of the metal bond.

Referring to FIG. 3, a photomicrograph of a sample is provided illustrating the elements of the bond of the invention. In FIG. 3 the region labelled A is the ceramic substrate, the region labelled B is the external metal and the region labelled C is the ionic interdiffused region. The jagged shapes are an illustration of what remains after an attempt to peel off the external metal layer.

BEST MODE FOR CARRYING OUT THE INVENTION

The preferred method of carrying out the invention in general is to apply the interlayer coating to the ceramic by a dry process such as sputtering or a wet process such as spinning followed by the application of the external metal with the interdiffusion heat treatment, either during or after application, being at the minimum temperature to provide the required bond, and yet be consistent with the properties of the materials involved.

In order to permit one skilled in the art to have a starting place in practicing the invention, specific examples illustrating the principles involved are provided for both the interlayer metal oxide and the external metal.

In Table 1, the ingredients in each of several example types are listed.

TABLE 1

| Example Type | Substrate | Interlayer | External Metal |
|---|---|---|---|
| I | $SiO_2$ | $Fe_2O_3$ | Ni |
| | $SiO_2$ | $Fe_2O_3$ | Cu |
| | $Al_2O_3$ | $Fe_2O_3$ | Ni |
| | $Al_2O_3$ | $Fe_2O_3$ | Cu |
| II | $SiO_2$ Glass | $Fe_{2.1}Ni_{0.9}O_4$ | Ni |
| III | Pyrex Glass Ceramic | $Fe_{2.28}Cu_{0.72}O_4$ | Ni |
| | Glass Ceramic | $Fe_{2.28}Cu_{0.72}O_4$ | 38 Ni 62 Fe |
| IV | Pyrex Glass Ceramic | $Fe_{1.68}Mn_{0.60}Cu_{0.72}$ | Ni |
| | Glass Ceramic | $Fe_{1.68}Mn_{0.60}Cu_{0.72}$ | 38 Ni 62 Fe |
| V | Pyrex Glass Ceramic | $Fe_{0.78}Mn_{2.22}O_4$ | Ti + Ni |
| | Glass Ceramic | $Fe_{0.78}Mn_{2.22}O_4$ | Ti + Ni |
| VI | Pyrex Glass Ceramic | $Fe_{0.87}Mn_{2.13}O_4$ | Ti + Cu |
| | Glass Ceramic | $Fe_{0.87}Mn_{2.13}O_4$ | Ti + Cu |
| VII | $SiO_2$ | $Mn_3O_4$ | Ni |
| VIII | Pyrex | $NiV_2O_4$ | 38 Ni 62 Fe |
| | Pyrex | $NiV_2O_4$ | Ti + Ni |
| IX | Pyrex | $Li_{0.5}Mn_{2.5}O_4$ | Mo + Ni |
| | Pyrex | $Li_{0.5}Mn_{2.5}O_4$ | Ti + Ni |

In general the interlayer is applied as a film in a dry process such as sputtering or evaporation or in a wet process such as by spinning. In Magnetron sputtering, for example, an alloy 38 Ni 62 Fe or Cu or Ni, a 30,000Å thick film is built up on a substrate at about 350° C. at the rate of 500Å per minute. A Ti film of 5000Å thickness is generally grown at a 100Å per minute rate. In sputtering the metals can be applied as mixtures, for example MnFe or NiFe followed by oxidation to form the oxide interlayer. In spinning the film of the Fe, Mn, Ti or V compound is spun on the glass or ceramic substrate and is then heated in the range between 450° C. and 900° C. in air.

The interlayer film strength and adhesion to the substrate is enhanced with a 700° to 900° C. heat treatment.

The general procedure for each example type in Table 1 is as follows.

EXAMPLE TYPE I

| $Fe(NO_3)_3.9H_2O$ | 2 grams |
| Isopropanol | 10 grams |
| Acetic Acid | 1 gram |

The solutions are mixed warm at 90° C. with stirring. To provide $Fe_2O_3$ interlayer, the mixed solution is spun at 500 RPM for 1 minute on $SiO_2$ and $Al_2O_3$ substrates.

Metals Cu and Ni, when sputtered at 25° C., could be peeled.

When heated in the range from 150° to 700° C. for 10 minutes, the Cu and Ni could no longer be peeled.

EXAMPLE TYPE II

| Fe Resinate | 1.5 grams |
| $Ni(NO_3)_2$ | 0.2 grams |
| Isopropanol | 13 grams |
| Acetic Acid | 2 grams |

Solutions are mixed and placed on a $SiO_2$ glass substrate providing an $Fe_{2.1}Ni_{0.9}O_4$ interlayer.

Ni metal, when sputtered at a high temperature of 350° C., could not be peeled.

EXAMPLE TYPE III

| Fe Resinate | 19 grams |
|---|---|
| Cu Resinate | 10 grams |
| Isopropanol | 15 grams |
| Acetic Acid | 10 grams |
| Dimethylformamide | 5 grams |
| Ethylenediamine | 3 grams |
| Phenol | 1.2 grams |

The solutions when mixed and placed on pyrex glass ceramic substrates provide a $Fe_{2.28}Cu_{0.72}O_4$ interlayer.

Ni and 38 Ni 62 Fe were sputtered at 350° C. and could not be peeled.

EXAMPLE TYPE IV

| Fe Resinate | 17 grams |
|---|---|
| Cu Resinate | 10 grams |
| Mn Acetylacetonate | 2.5 grams |
| Acetic Acid | 10 grams |
| Isopropanol | 6 grams |
| Dimethylformamide | 6 grams |
| Ethylenediamine | 3 grams |
| Phenol | 1.2 grams |

The solutions when mixed and placed on pyrex glass ceramic substrates provide a $Fe_{1.68}Mn_{0.60}Cu_{0.72}O_4$ interlayer.

When Ni and 38 Ni 62 Fe metals are sputtered on at the 350 interdiffusion temperature neither layer could be peeled.

EXAMPLE TYPE V

| Fe Acetylacetonate | 4.5 grams |
|---|---|
| Mn Acetylacetonate | 4.5 grams |
| Isopropanal | 25 grams |
| Acetic Acid | 25 grams |
| Dimethylformamide | 8 grams |
| Phenol | 1 gram |

When the solutions are mixed and placed on pyrex glass ceramic substrates by spinning at 500 to 1000 rpm a $Fe_{0.78}Mn_{2.22}O_4$ interlayer is provided.

Metal layers of Ti followed by Ni were sputtered at the interdiffusion temperature of 350° C. and could not be peeled.

EXAMPLE TYPE VI

| Mn Acetylacetonate | 3.93 grams |
|---|---|
| Fe Acetylacetonate | 2.62 grams |
| Isopropanol | 15 grams |
| Acetic Acid | 15 grams |
| Dimethylformamide | 3 grams |
| Phenol | 2 grams |

When the solutions are mixed and applied dry at 150° C. on pyrex glass ceramic substrates a $Fe_{0.87}Mn_{2.13}O_4$ interlayer is provided.

(a) A layer of Ti metal followed by a layer of Cu metal sputtered at the interdiffusion temperature of 350° C. could not be peeled.

(b) A layer of Ti metal followed by a layer of Cu metal sputtered at 150° C. peeled at the Ti substrate interface.

(c) A layer of Ti metal followed by a layer of Cu metal sputtered at 150° C. followed by a heat treatment at 600° C. in $N_2$ could not be peeled.

EXAMPLE TYPE VII

| Mn Acetylacetonate | 2.2 grams |
|---|---|
| Isopropanol | 10 grams |
| Acetic Acid | 2 grams |
| Dimethylformamide | 1 gram |

When the solutions are mixed, applied to a $SiO_2$ substrate and heated to 450° C. from an oxide a $Mn_3O_4$ interlayer is provided.

A layer of Ni metal when sputtered at the interdiffusion temperature of 350° C. could not be peeled.

EXAMPLE TYPE VIII

| Vanadium (IV) oxide bis (2,4-pentanedionate) | 1.06 grams |
|---|---|
| Ni Acetate $Ni(OOCCH_3)_2.4H_2O$ | 1.00 grams |
| Acetic Acid | 6.0 grams |
| Dimethylformamide | 5.0 grams |

The solutions are mixed and applied to a pyrex substrate providing an interlayer of $NiV_2O_4$.

When a layer of 38 Ni 62 Fe 30,000Å thick is sputtered on the interlayer at the interdiffusion temperature of 350° C., the metal layer could not be peeled.

When a layer of Ti 5000Å thick covered by a layer of Ni 30,000Å thick is sputtered on the interlayer at the interdiffusion temperature of 350° C., the combined metal layers could not be peeled.

EXAMPLE TYPE IX

| $LiNO_3$ | 0.24 grams |
|---|---|
| Mn Acetylacetonate | 2.2 grams |
| Isopropanol | 28.0 grams |
| Acetic Acid | 19.0 grams |
| Dimethylformamide | 3.0 grams |
| Phenol | 2.0 grams |

The solutions are mixed and applied to a pyrex substrate providing a $Li_{0.5}Mn_{2.5}O_4$ interlayer film 400Å thick.

A layer of Mo 5000Å thick covered by a layer of Ni 30,000Å thick when sputtered over the interlayer at the 350° C. interdiffusion temperature could not be peeled.

A layer of Ti 5000Å thick covered by a layer of Ni 30,000Å thick when sputtered over the interlayer at the 350° C. interdiffusion temperature could not be peeled.

EXTERNAL METAL EXAMPLE 1

Copper External Metal

A fused quartz ceramic is coated with $Fe_2O_3$ approximately 2000Å thick.

A layer of Cu approximately 4 micrometers ($\mu m$) thick is vacuum evaporated over the $Fe_2O_3$ coating on the quartz.

The combination is heated in the range of 780° to 950° C. in an oxygen partial pressure of $10^{-5}$ to $10^{-12}$ atm.

The intermediate ionic diffusion accommodation layer formed from the $Fe_2O_3$ was determined by magnetic resonance to be magnetic and from X-ray diffraction to have a spinel like structure with a lattice parameter in the field $CuFe_2O_4$-$Fe_3O_4$-$CuFe_5O_8$.

The average bond strength measured by a pull test is 4.0 ±1.0 kilopounds per square inch (Kpsi). The failure appears in the fused quartz not at the bond. Care is indicated to minimize dissolving Cu during step 3 into the quartz which may weaken the quartz.

The photomicrograph of the bond cross section shown in FIG. 3 illustrates the ionic diffusion in the region labelled C.

A reduction in the oxygen partial pressure to $10^{-18}$ atm reduces the pull strength to 0.7 Kpsi. It is considered that the low oxygen pressure does not permit formation of the needed copper ions.

The identical procedure using a glass ceramic provides a pull test of 10.3 ±1.0 Kpsi which, when the oxygen partial pressure is reduced to $10^{-18}$ atm is reduced to 0.1 Kpsi.

$Cr_2O_3$, $TiO_2$, and $V_2O_5$ do not react as easily as $Fe_2O_3$ but are responsive to the following procedure:

The heat treatment temperature range is increased to between 800° C. and 1000° C. in the presence of a gas containing $H_2$ between 0.15% and 0.65% and $N_2$ between 99.85% and 99.35%. The gases are mixed and passed through a water reactor at 20° to 30° C. which imparts a water content.

Cu external metal using the above techniques in addition to quartz may also be bonded to the following glass ceramic materials: $SiO_2$, glass, 90–100% $Al_2O_3$ ceramics and $Al_2O_3$-$SiO_2$ ceramics.

EXTERNAL METAL EXAMPLE 2

Ni-Fe Alloy (INVAR) External Metal

An $Al_2O_3$-$SiO_2$ ceramic is coated with $Fe_2O_3$, $Mn_2O_3$ and CuO forming a 2000Å film of 56 Fe 20 Mn 24 Cu oxide heated in air at 650° C.

A 3 μm film of 38 Ni 62 Fe (Invar) is applied to the coated ceramic by the technique of sputtering.

The combination is then subjected to heat treatment in the range of 700° C. to 900° C. in the presence of a mildly reducing gas such as 1% $H_2$ and 99% $N_2$ that has passed through water.

The bond adhesion is improved in heat treatment above 500° C.

EXTERNAL METAL EXAMPLE 3

Ti-Ni Layered External Metal

A pyrex ceramic is coated with a 300Å thick film of $Mn_2FeO_4$.

A first layer of Ti, 5000Å thick, is applied over the $Mn_2FeO_4$ coating by the technique of sputtering on the substrate at 350° C.

A second layer of Ni, 3 μm thick, is applied over the Ti layer by the technique of sputtering at 200° to 350° C.

The 350° C. temperature is sufficient to provide the bond of Ti to $Mn_2Fe_3O_4$ and no further heat treatment is needed.

Upon cooling the expansion mismatch between the layers of Ti and Ni causes the metal to assume a curved shape. The metal-ceramic bond does not separate and the fracture occurs in the pyrex.

EXTERNAL METAL EXAMPLE 4

Ni External Metal

An $SiO_2$ glass substrate is covered with an $Fe_{2.1}Ni_{0.9}O_4$ interlayer approximately 2000Å thick.

A layer of Ni approximately 30,000Å thick is sputtered over the $Fe_{2.1}Ni_{0.9}O_4$ interlayer at an interdiffusion temperature of approximately 350° C.

The Ni metal layer could not be peeled from the substrate.

EXTERNAL METAL EXAMPLE 5

Mo External Metal

A pyrex substrate is covered with a $Li_{0.5}Mn_{2.5}O_4$ interlayer approximately 400Å thick.

A layer of Mo approximately 5000Å thick is sputtered over the interlayer at an interdiffusion temperature of about 350° C.

A layer of Ni approximately 30,000Å thick is sputtered over the Mo layer at an interdiffusion temperature of about 350° C.

A peeling force was unable to peel the combined layers from the substrate.

What has been described is the bonding of an external metal to an oxide ceramic at lower temperatures wherein the external metal is attached to an interlayer of a metal oxide that does not necessarily include the metal of the ceramic by an ionic interdiffusion between the metal and the oxide interlayer.

Having thus described our invention, what we claim as new and desire to secure by Letters Patent is:

1. In the attachment of an external metal to an oxide ceramic through the use of an intermediate metal oxide layer the improvement comprising imparting to the intermediate metal oxide layer the combined properties of formation of an oxygen-metal bond to said ceramic and an ionic difusion type bond with said external metal by providing in said intermediate metal oxide layer a metal from the group of Fe, Mn, Ti and the 33 Ni 67 V combination, providing as said oxide ceramic at least one member of the group of glasses, quartz, $SiO_2$, $Al_2O_3$ and combinations thereof and providing as said external metal at least one member of the group of Cu, Ni, Fe, Ti, Mo and alloys thereof.

2. The improvement of claim 1 wherein said oxide ceramic is taken from the group of $SiO_2$ and $Al_2O_3$, said intermediate layer is $Fe_2O_3$ and said external metal is taken from the group of Cu and Ni.

3. The improvement of claim 1 wherein said oxide ceramic is $SiO_2$ glass, said intermediate layer is $Fe_{2.1}Ni_{0.9}O_4$ and said external metal is Ni.

4. The improvement of claim 1 wherein said oxide ceramic is taken from the group of pyrex glass ceramic and glass ceramic, said intermediate layer is $Fe_{2.28}Cu_{0.72}O_4$ and said external metal is taken from the group of Ni and 38 Ni 62 Fe.

5. The improvement of claim 1 wherein said oxide ceramic is taken from the group of pyrex glass ceramic and glass ceramic, said intermediate layer is $Fe_{1.68}Mn_{0.60}Cu_{0.72}$ and said external metal is taken from the group of Ni and 38 Ni 62 Fe.

6. The improvement of claim 1 wherein said oxide ceramic is taken from the group of pyrex glass ceramic and glass ceramic, said intermediate layer is $Fe_{0.78}Mn_{2.22}O_4$ and said external metal is Ti +Ni.

7. The improvement of claim 1 wherein said oxide ceramic is taken from the group of pyrex glass ceramic and glass ceramic, said intermediate layer is $Fe_{0.87}Mn_{2.13}O_4$ and said external metal is Ti +Cu.

8. The improvement of claim 1 wherein said oxide ceramic is $SiO_2$, said intermediate layer is $Mn_3O_4$ and said external metal is Ni.

9. The improvement of claim 1 wherein said oxide ceramic is pyrex, said intermediate layer is $NiV_2O_4$ and said external metal is taken from the group of 38 Ni 62 Fe and Ti +Ni.

10. The improvement of claim 1 wherein said oxide ceramic is pyrex, said intermediate layer is $Li_{0.5}Mn_{2.5}O_4$ and said external metal is taken from the group of Mo +Ni and Ti +Ni.

11. A bond of an external metal taken from the group of Cu, Ni, Fe, Ti, Mo and alloys thereof joined to an oxide ceramic member having at least one ingredient taken from the group of glasses, quartz, $Al_2O_3$ and $SiO_2$ through an interstitial adhesion layer of an oxide of a metal taken from the group of Fe, Mn, Ti and the 33 Ni 67 V combination.

12. The bond of claim 11 wherein said interstitial adhesion layer oxide includes additional bond strength and processing addition elements taken from the group of Li, Ni, Cu, Co and Mo.

* * * * *